(12) United States Patent
Baucke et al.

(10) Patent No.: US 6,820,269 B2
(45) Date of Patent: Nov. 16, 2004

(54) METHOD AND APPARATUS FOR IMPROVING PERFORMANCE IN A NETWORK WITH HIGH DELAY TIMES

(75) Inventors: Stephan Baucke, Herzogenrath (DE); Margarethe Zmuda, Herzogenrath (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 531 days.

(21) Appl. No.: 09/730,873

(22) Filed: Dec. 5, 2000

(65) Prior Publication Data

US 2001/0021183 A1 Sep. 13, 2001

(30) Foreign Application Priority Data

Dec. 13, 1999 (EP) .............................................. 99124727

(51) Int. Cl.[7] ................................................ G06F 3/00
(52) U.S. Cl. ........................... 719/328; 719/311; 718/1; 718/100; 718/108
(58) Field of Search ................................. 709/102, 205, 709/310, 314, 330; 719/311, 328; 718/1, 100, 108

(56) References Cited

U.S. PATENT DOCUMENTS 6,161,152 A * 12/2000 Garg et al. .................... 710/46
6,282,702 B1 * 8/2001 Ungar .......................... 717/148

FOREIGN PATENT DOCUMENTS

EP           0 770 958 A1      5/1997

OTHER PUBLICATIONS

International Search Report dated May 14, 2001.
"An Asynchronous Remote Procedure Call System for Heterogeneous Programming," Lin et al., Proceedings of the Annual International Phoenix Conference on Computers and Communications, *IEEE Comp. Soc. Press*, vol. CONF. 10:153–159 (Mar. 27, 1991).
A Survey of Asynchronous Remote Procedure Calls, Asanda et al., *Operating Systems Review (SIGOPS)* 26(2):92–109 (Apr. 1, 1992).
"Windows Sockets 2 Service Provider Interface," Hall, *Windows Sockets 2, Revision 2.2.2, Online*:1–233 (Aug. 7, 1977).

* cited by examiner

*Primary Examiner*—Saleh Najjar (57) ABSTRACT

Method and a device are disclosed for a fast performance of network operations via a network with high delay times by means of a module for processing system calls of an application layer and for initiating network operations of a network layer. In the module a differentiation between a blocking and non-blocking implementation mode is made. A non-blocking execution mode means that the considered system call returns a logical value as a result to the application, which signals whether the system call was successfully executed. In this case it is provided by the method and device to directly send a logical value to the application when a non-blocking system call is called, without having waited for the actual result of the operation executed in the communicating partner instance and corresponding to the system call. The handling of the results of the actually executed operations takes place at a later time. With this modification, the network operations, which are derived from the system calls, are executed faster, as the actual result is not waited for at each call, which also implies the reduction of the number of required RTTs (Round Trip Time).

14 Claims, 4 Drawing Sheets

METHOD AND APPARATUS FOR IMPROVING PERFORMANCE IN A NETWORK WITH HIGH DELAY TIMES

TECHNICAL FIELD OF THE INVENTION

The invention relates to a method and a device for a fast performance of network operations via a network characterized by high delay times.

HISTORY OF THE RELATED ART

One example for a network having high delay times is the GSM (Global System for Mobile Communication) network. The GSM network is a digital mobile communication network with a usable data rate of 9.6 kBit/s per channel. In contrast to today's fixed networks, such as the ISDN (Integrated Service Digital Network), the data rate of which goes up to 64 kBit/s, the data rate of GSM is small. Therefore, a GSM connection very strongly influences in a heterogeneous network connection, i.e. in a connection extending over at least two different networks, the absolute throughput of the entire connection. This particularly causes problems, if a GSM user has set up a connection to an internet service provider (ISP) with the purpose of the so-called web-surfing or/and downloading data from the internet. In said scenario the GSM connection constitutes the critical part of the connection with respect to the effective transmission rate.

The exchange of information between the communicating partner instances, in this case between the GSM terminal and the internet service provider (ISP), is based on a protocol stack which is standardized for the internet applications, namely the so-called TCP/IP (Transmission Control Protocol/Internet Protocol) protocol stack. Said protocol stack comprises five protocol layers, hereinafter also called layers. The uppermost layer, the application layer, comprises applications directly used by a user, for instance, surfing the internet is one of the possible applications available to the user. Directly underneath the application layer is a transport layer comprising the transport protocols fulfilling the tasks of said layer, such as the TCP (Transmission Control Protocol) or the UDP (User Datagram protocol). The internet protocol (IP), for example, forms the network layer. The two lowermost layers, the link layer and the physical layer, can be summarized by the term of network-oriented layer, as they are specifically defined in response to the underlying network.

Among others, it is the task of a layer to process the received data or the data to be transmitted. In this respect the communication of one layer exclusively takes place with the directly adjacent layers. The data provided for the transmission are passed on from one layer to the layer lying directly underneath thereof, whereby the data are formatted. Frequently the data of the application layer exceed the size of the packets, which can be transmitted via a physical connection. For this reason a message is divided into smaller data packets, which are arranged consecutively for a transmission. The division of the data is part of the formatting. The formatting of the data is performed on each protocol layer. The formatting of the data includes particularly the addition of control data characteristic for each protocol layer. In most cases the control data are added at the beginning of a data packet in the from of the so-called header or/and at the end in the form of the so-called tail. The actual data are contained in the data field. Said control data are characteristically defined and standardized for each layer, for only in this way can a uniform communication between two partner instances be guaranteed. In connection with the present invention specific control data of the TCP are significant.

The transport protocol TCP renders a reliable transport service for a byte flow between two communicating partners. Reliability in this respect refers to the avoidance of errors, maintenance of sequence and protection against data losses and duplicates. The byte flow to be transmitted, which is passed on from the application layer to the TCP layer, is sub-divided by the TCP into segments, which will then be transmitted as IP datagrams. An IP datagram designates a data packet formatted according to the rules of the IP protocol. Datagrams have the property that the exchange of data realized by using datagrams is not reliable. Thus, the IP cannot guarantee that a packet is really transported to a receiver. Also, IP datagrams can arrive at the receiving side in the wrong order or as duplicates. Within said concept it is, however, the task of the TCP to detect the faulty transmission and to remove the errors that have occurred. Due to the hierarchy principle the IP datagrams are moreover transmitted to the layer lying directly underneath thereof.

For the realization of the set tasks a number of laborious mechanisms has been integrated into the TCP. The individual mechanisms such as the window mechanism, the cumulative acknowledgment scheme, the so-called Slow-Start-Algorithm or an algorithm for avoiding congestions, the so-called Congestion Avoidance Algorithm, will not be described in more detail. The exact description of said methods can be inferred from "TCP/IP. Illustrated, Volume 1" by W. Richard Stevens.

Figure 2:
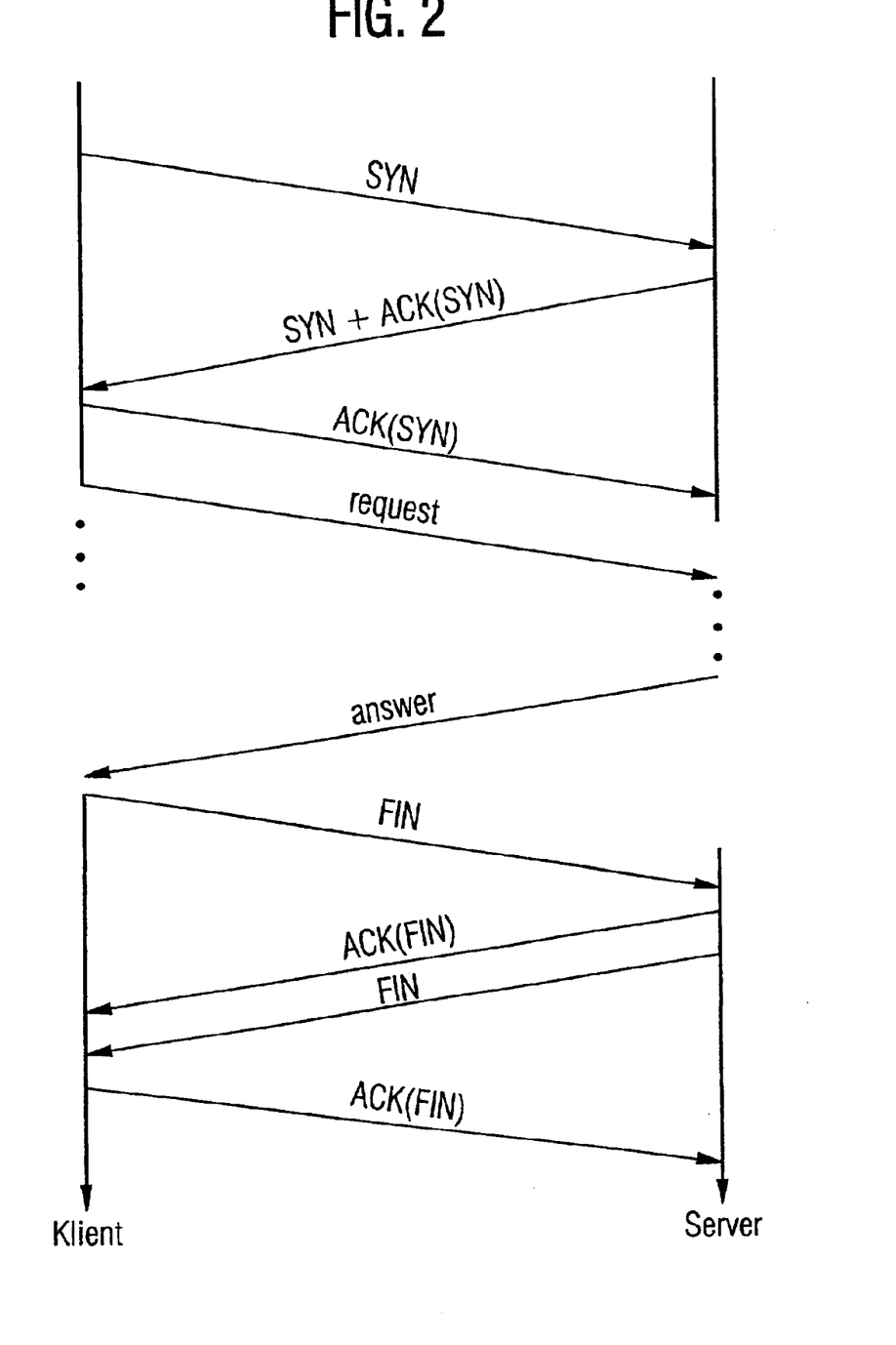
FIG. 2 shows a schematic illustration of the three-way handshake.

One important mechanism, which will herein be dealt with more closely, relates to the connection set-up with TCP. When a connection is set up, TCP uses the so-called three-way handshake securing the exchange of fixedly defined signaling information. The facts can be seen in FIG. 2. The communicating partners are called client and server, wherein the client is the communication initiating unit and the server is the communication taking unit. Altogether an exchange of three messages will be required for the connection set-up between the client and the server. With sending the first message, the initial sequence numbers between the communicating partners are declared. The data packets which are exchanged are identified by a precise number, the so-called sequence number. For this purpose a header of a TCP data packet is provided with a field, which serves the synchronization of the sequence numbers when the connection is set up, the so-called SYN flag, in FIG. 2 designated by SYN. If the server is ready to take the connection, it responds with a message containing the set SYN flag and an acknowledgment for the initial sequence number of the client ACK (SYN). The client finally sends a message with the acknowledgment for the SYN message of the server ACK(SYN). When the three messages have been exchanged, the connection set-up phase is completed. In the next step the data are transmitted, which is the actual communication being completed by a connection set-up. The connection initiation requires an exchange of four messages. At first, a message containing the set FIN flag (FIN), which effects the disconnection of the connection into the sent direction, is sent from the client to tri the server. The client thereby initiates the connection. The server acknowledges the receipt of this message with ACK(FIN) and equally initiates the disconnection phase. For this purpose he sends the message with the set FIN flag (FIN) to the client, who answers with ACK(FIN). Upon this exchange of messages the connection initiation is completed.

Altogether a minimum of seven messages or three and a half so-called RTTs (Round Trip Time) are required for the set-up and initiation of the connection. An RTT describes a time margin between the sending of a request message and the receipt of the pertinent response message. Said time varies correspondingly in response to the transmission rate of the underlying network.

Many applications are, however, based on a simple interaction between the communicating partner instances. One example for a simple interaction is the so-called transaction, whereby a client sends a request message to the server and the receiver sends the requested information to the sender in a response message. Said kind of data exchange can, for example, be found in the internet and is characterized by a transaction-oriented traffic pattern of the World Wide Web protocol. The transactions in the internet are caused mainly due to the used HTTP protocol.

With the currently used protocol version HTTP/1.0, RFC 1945 "Hypertext Transfer Protocol—HTTP/1.01" by Berners-Lee, R. Fielding and H. Frystyk, May 1996, a TCP connection is set up first for each requested object of a WWW page, for instance, a text block or an image. Only then is a transaction carried out, i.e. the sender sends a request message to the receiver, go who then sends the requested data in a response message. Thereafter the TCP connection is disconnected again. Said fact has a considerable influence on the total performance of a session, if an explicit connection has to be set up for each object, be it only a small image object, which connection is based on the three-way handshake, which again requires at least three messages for the set-up and four for the initiation.

The tasks that have to be fulfilled by the TCP already show that the TCP was designed for network situations characterized by fast data transmission and small transmission failures, which happens with wire-bound data networks. These assumptions are, however, not fulfilled in the GSM, which is one cause for a non-optimal functionality of TCP in this kind of networks. A number of documents shows concepts dealing with the optimization of TCP for networks having a small transmission capacity. An example for a solution will hereinafter be introduced.

"T/TCP—TCP Extensions for Transactions Functional Specification" RFC 1644 by R. Braden introduces a concept, which optimizes in particular the connection set-up phase. For this purpose information in respect of the connection to a specific server are buffered. Thus, the complete three-way handshake is performed exclusively with the first connection set-up to a server, and the information relating to the configuration of the connection, which are declared during said connection set-up, are buffered. In subsequent accesses to the same server the complete connection set-up is phase bypassed by taking the configuration from the stored information.

The disadvantage of this solution, however, lies in the non-existing transparency for the applications. The realization of is this concept requires the modification of system calls in an application. A faster connection set-up is, for example, obtained by replacing the system calls "connect" and "send" by "sendto". Said system calls are part of the so-called socket programming interface, the more exact functionality of which can be inferred from the description below.

SUMMARY OF THE INVENTION

In accordance therewith it is an object of the invention to provide a method and a device for realizing an efficient performance of transactions between two communicating units via a transmission link characterized by high delay times.

It has thereby shown to be an advantage that the optimization of the performance of the transactions has a direct influence on the efficiency of the applications, as a fast performance of transactions guarantees a more stable working manner of applications being sensitive to delays.

Another advantage consists in the independence of the realization of the invention from the application layer as well as from the transport layer, as it is guaranteed that the use of the invention remains transparent for both layers.

BRIEF DESCRIPTION OF THE DRAWINGS

In the following the invention will be explained in more detail by means of embodiments and figures, wherein FIG. 3 shows an illustration of a connection set-up according to 3*a*) the prior art 3*b*) the invention.

DETAILED DESCRIPTION OF THE EXEMPLARY PREFERRED EMBODIMENTS

Figure 1:
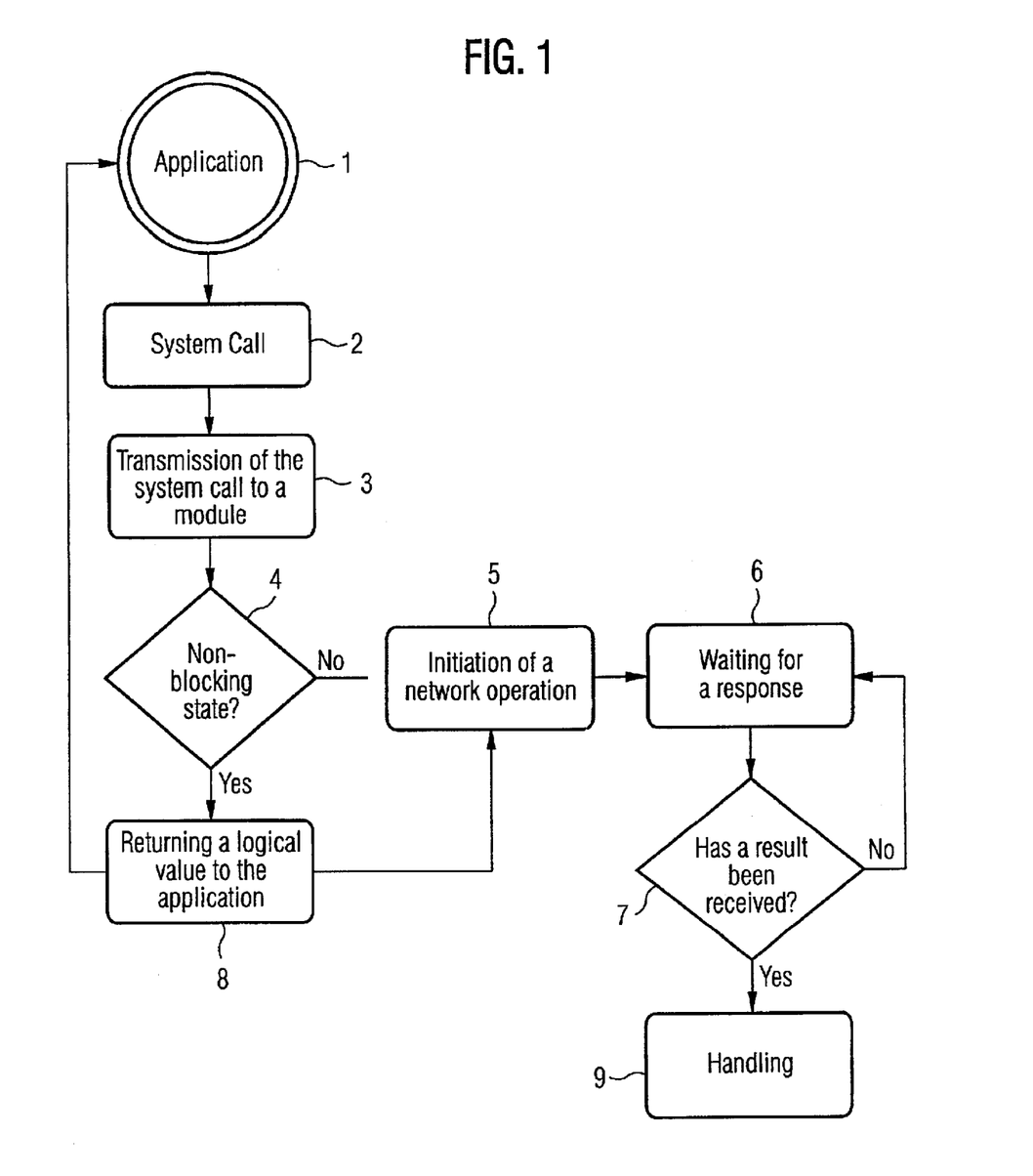
FIG. 1 shows a flow chart of the method according to the invention.

According to FIG. 1 an application 1 calls for a system call 2, which in step 3 is transmitted to a module, a so-called pipeline module. The first task of the pipeline module consists in the determination of the system call 4 concerning its execution mode, i.e. whether it is a blocking or a non-blocking system call. If the pipeline module recognizes the system call as a blocking call, it will be proceeded in a known manner, in other words, a network operation is initiated 5 and the calling application remains blocked 6 until a result of the initiated network operation is returned 7. The blocking state of the application can be recognized in FIG. 1 by that no arrow goes back to the application from the blocking performance mode, but a network operation is exclusively initiated 5. In the case of a non-blocking system call a logical value is directly returned to the application 8. This step makes is possible that the application continues with the subsequent program steps without it remaining blocked, in order to wait for the result of the system call actually executed in the partner instance. The term "direct" here refers to the time needed for determining the logical value in the unit initiating the network operations. As this is done locally in said unit, said time is considerably shorter than the time required for the transmission of the network operation via a network, for the execution of the system call in the partner instance and for sending and receiving the result.

The direct return of the logical value in the case of a non-blocking execution mode equally entails the initiation of a network operation 5. This either takes place shortly before the return of the logical value or directly afterwards. With the non-blocking system calls the result of the initiated network operation is equally waited for in the pipeline module 6, which, however, takes place independently from the running application. Upon the receipt of a result said result is examined and handled 9 in correspondence with the execution mode and the returned value.

In the following an example for the handling of the received results will be explained.

At first, a received result is examined for the execution mode. If a result is from a non-blocking system call it is clear that the application is running at that time and is waiting for a result in a non-blocking state. For this reason the received result is stored. In a next step the result will be examined for its value, i.e. whether it is negative or positive. If the result is negative, it will be marked, for instance, by means of a special note, in order to thereby mark the necessity of an error message for the application. A negative result refers to the occurrence of an error, for example, a disconnection of a connection, and this fact has to be reported to the running application. One way to implement the invention in view of the error message is the error message is as early as to effect possible. For this reason it is best to check with each system call first whether negative results and results of previous of calls, that have not been reported so far, are stored. If it is realized by said examination that pending negative results are present, said results are returned to the application as a return value in the presently executing system call in the form of a logical negative value.

A similar procedure concerning the return value takes place with a result containing a response to an application being in a blocking state. In this case it is equally checked at first whether negative results that have so far not been reported, are stored. If it is realized by means of said examination that pending negative results are present, said results will be returned to the application as a return value in the form of a logical negative value. If, however, no negative results exist, the currently received value is returned to the application.

In theory one talks about messages in the form of data packets, which are sent in order to, for example, set up a connection. In practice this can, for example, be realized with a programming interface implementing a conversion of programming commands of the application layer to network operations of a network layer. Said programming commands can be realized as system calls enabling the user to have access to the network services.

A network service is formally characterized by a number of service elements or network operations, via which the user is able to use the service. These service elements take care, for example, that the service performs a certain activity or that it reacts to an activity by the partner instance in a certain manner. Within a protocol stack such as TCP/IP or OSI (Open Systems Interconnection) different service elements are distinguished. Said service elements take care that a service performs a certain activity. For example, the set-up of a connection is initiated by means of the service element "request" and the activity "CONNECT". In the OSI format the corresponding message has the format CONNECT.request. If said Up request has been met, the partner instance receives a signal via an indication, which announces an activity. For example, the addressed partner instance receives a CONNECT.indication after a CONNECT.request, which means that the set-up of a connection is desired. Said instance then uses a response message, in this case the CONNECT.response, in order to thereby communicate whether it wants to take or refuse the connection request. The partner instance, which issued the original CONNECT.request, learns by means of an acknowledgment, the so-called CONNECT.confirm, about the readiness of the partner instance. The described example refers to a connection set-up initiated by CONNECT. Comparable service elements are also defined for other operations such as the sending of the data (SEND), which will not be dealt with more closely at present. The described example, however, shows that the specification of the network operations is very abstract. For example, for the operating system Unix 4.3BSD a uniform programming interface for the system-independent access to network services, the so-called socket interface, was therefore introduced. This provides a more distinct specification of the service elements. The initiation of a message thereby concretely refers to the specification of programming commands on the application layer. The socket interface then realizes the conversion of the programming commands, which will hereinafter be called system calls or calls, into the services elements. In the following said programming interface will be used as an example with the purpose of explaining the invention.

The socket programming interface comprises a set of system calls each referring to a so-called socket. In terms of the concept a socket constitutes a terminating point of a communication, to which a network connection is attached on one side and an application on the other side. The most important system calls will hereinafter be specified in more detail. A new socket is generated with a system call socket, whereby the address format, the type of the socket and the protocol are specified as parameters. For a TCP connection, for instance, the internet address format, a connection-oriented socket type and the TCP/IP protocol are selected. By means of the system call connect an application requests a connection to a remote socket in the network. The local socket and the address of the remote socket are hereby included as parameters. Each connection is accordingly clearly characterized by a pair of sockets. The actual sending of the data is effected by the call send, and the reading of received data by the call recv. There are still some more system calls in addition to the examples mentioned herein, which, however, will not be dealt with in more detail for clarity reasons. The system calls are converted into the network operations by means of a programming interface. This means that, for example, the performance of a call connect causes the initiation of the three-way handshake. The user has no direct influence on the performance of the network operations. The access to the network operations can, however, be controlled by the user by means of the system calls. In order to avoid the modification of present applications it is accordingly one object of the invention to integrate an additional layer between the system calls and the network operations, which causes a transparent conversion of both kinds of operation without changing the implementation of the application. Said additional layer, hereinafter called pipeline module, has the task of interpreting and correspondingly processing the system calls received from an application.

The principal task of the pipeline module, however, lies in the determination of the execution mode of a system call, i.e. in the decision of whether a result of a system call can directly be passed on to the application, or whether the application has to wait for the actual value of the operation being executed by a server. In the first case a non-blocking system call is concerned, and in the second case, in which the application expects an actual value of the executed operation, a blocking system call is concerned. This means that the pipeline module has to make a difference between the two types of system calls, which can be realized in the following manner. If the return value has a logical propositional value, i.e. if a 1 for true is returned in the case of a successfully executed operation and if a 0 for wrong is returned in the case of an unsuccessfully executed operation, an application recognizes that a non-blocking call is concerned, and this implies a direct return value to the application. Upon the receipt of the value the application continues with the performance of the next operation. The status of the pending operation, i.e. the operation that has been sent to a server, in connection with which, however, no actual value has so far been received, is buffered in the pipeline module. The storage of the status is necessary to allow the pipeline module to allocate the actual value upon the receipt thereof to an operation still being in the pending state.

In the case of a blocking system call, which is characterized in that data and not logical values are awaited as return value of the system call, the pipeline module does not return a direct value to the application, but it is waited until the actual data are received. During this time the application remains blocked. With the exception of those system calls, which do not return a logical return value but data, the system has to make sure that the last system call of a connection is additionally also set into a blocked state, for only in this way is the return of the results of the if previously executed operations guaranteed. According to the semantics of the socket programming interface it is required to perform the closure of a socket upon the termination of its use, which is done by using the system call close or shutdown, i.e. system calls which can be realized in a blocking mode.

A problem in view of the optimization by the present invention lies in the semantic change of the return values in the non-blocking socket calls, the actual performance of which is not awaited. For this reason it is important that the pipeline module ensures the control over the executed system calls with a corresponding message to the application. If, for example, the call connect fails, because the addressed IP address cannot be reached due to a network failure, the pipeline module only learns about the corresponding error after the receipt of the pertinent return value and after the application considers said call as having been successfully terminated. The return value is, however, stored in the pipeline module upon the receipt thereof and reported in a next system call to the application. The preferred realization provides that the communication directly takes place in the following system call, which provides the error report as early as possible. The computer time for checking the pending error reports is shorter than the transmission time in the GSM. Therefore, an examination of the return values present in a pipeline module can be realized without much effort.

Another possibility lies in reporting the occurred errors in the next system call, which is executed in the blocking state.

These embodiments will depend on the implementation. In both cases it is, however, necessary to realize the execution of the last system call in a blocking state.

The "delayed" error report does not entail any problems in the known applications, as in connection also with the TCP they are prepared that errors can occur at any time.

The realization of the invention is hereinafter explained in more detail by means of an embodiment and FIGS. 3a and 3b. On one hand, the figures illustrate the executed system calls initiated by an application, which is illustrated on the left-hand side of the figures. The right-hand sides of the figures show the network operations, with which the execution of the corresponding system calls is initiated.

Figure 3A:
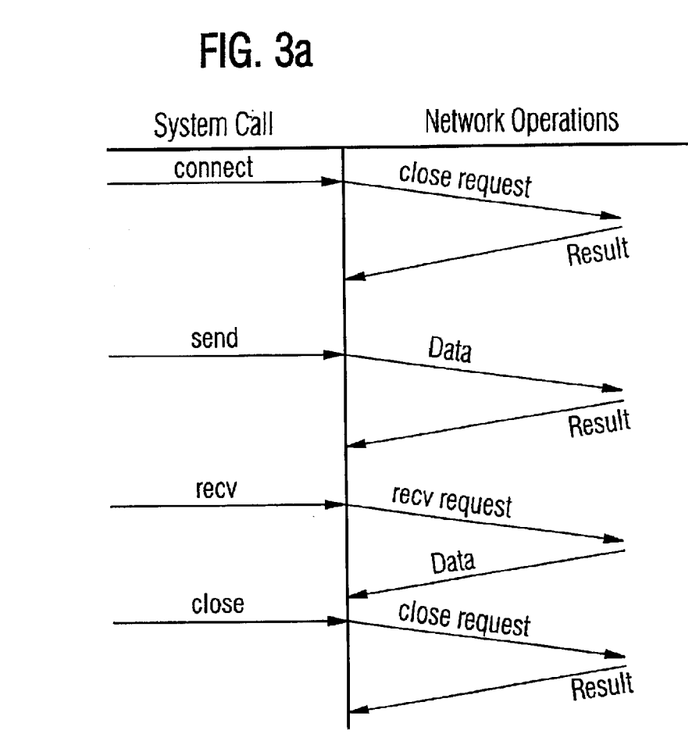
Figure 3B:
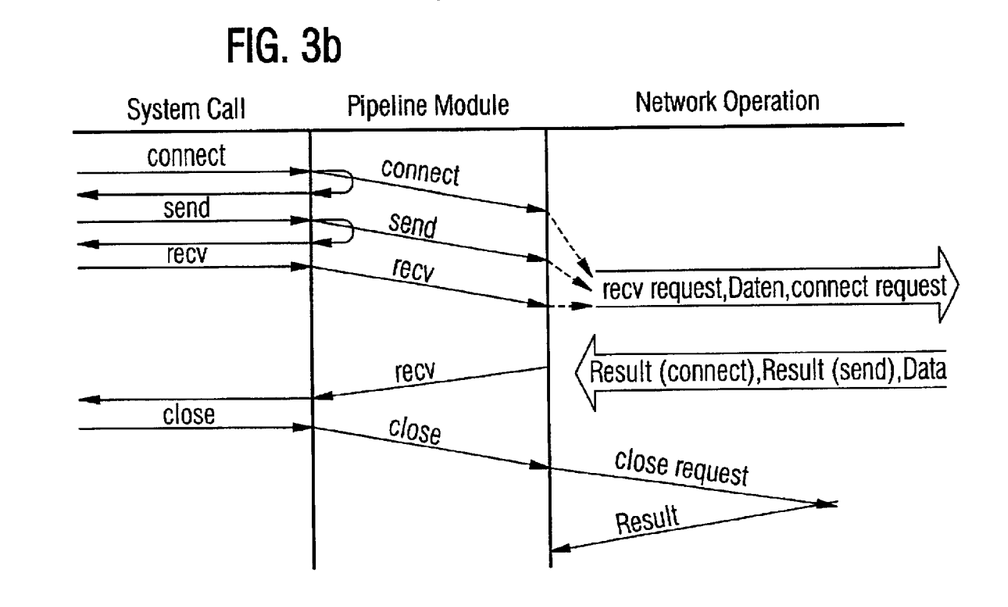

The embodiment according to FIG. 3a shows a connection set-up, which is implemented in the protocol HTTP 1.0, RFC 1945, in the prior art. In this protocol, which is used for calling WWW pages, a separate connection is set up for each object. A connection is realized according to FIG. 3a by means of a first call connect. As a consequence the data, for example an object, are requested by means of a first and a second call, send and recv, and transmitted and the connection is thereafter initiated by means of another call close.

In accordance with the present invention a converted system call is not directly transmitted via a transmitting means, but it is first passed on to the pipeline module, which is responsible for processing the system call. According to FIG. 3b a first system call connect is initiated in a first step, which is interpreted by the pipeline module as a non-blocking system call. This illustrated in such a way that the pipeline module sends the corresponding network operations to the server on one hand by simultaneously directly sending a result in view of the system call to the application, without having waited for the actual result of the operation performed in the server. The direct transmission of the result is marked by a directly returning arrow.

This method has the effect that the application does not have to be set into a blocking state, which lasts a whole RTT id (Round Trip Time), but that the performance of the following is steps is continued directly upon the receipt of the result. According to FIG. 3b it is another system call send, which is handled in the same manner as was the first system call connect. The next system call is received. Said system call is also transmitted to the pipeline module first, which identifies it as a blocking call, for data are expected as return value. For this reason the pipeline module cannot return a direct result to the application, but it is waited for the result of the system call actually performed in the server. Due to the fact that the operating time of a computer is shorter in contrast to the transmission time of a network connection, in particular a GSM connection, the sending of the network operations takes place directly one after the other. For this reason two RTTs are saved in the present case, as it is not waited for the result of the system calls connect and send. Said result is returned together with the result of the system call received. The sending of the network operations directly one after the other is illustrated in FIG. 3b by means of a broader arrow, which contains the corresponding network operations according to the sending order.

Characteristic for the invention is its independence from a transport platform, as the functionality is also ensured if a transport protocol other than T/TCP is used. In the case of T/TCP both system calls connect and send are interpreted as a so-called sendto system call. The use of said other protocol, however, does not change anything in view of the total saving of the required RTTs, the number of which is reduced from 3 to 1 in the illustrated example.

In the following the invention will be explained in more detail. With the device according to the invention for a fast performance of network operations via a network having long delay times, the execution mode for a system call is determined by means of a determining element. In this respect a difference is made between a blocking and a non-blocking state. A system call is converted into a network operation by means of converting means. The sender sends the network operations to a communication unit. The results of the network operations executed in a communication unit are received by the unit initiating the network operations by means of a receiver. The received results are stored in a memory and processed by means of a processing element in accordance with the contained value. According to the present invention a difference is made between negative and positive values.

In the case of a non-blocking system call the result of the system call executed in a partner instance is awaited once the corresponding network operation has been initiated, without blocking the execution of the application. This is realized by means of elements for realizing such a state.

The realization of the invention is based on that an additional module, the above-mentioned pipeline module, is provided underneath the socket programming interface. For this reason the implementation of the invention has to be realized on the layer of the operating system by taking into account the different configurations of the different operating systems. The basic idea of the socket programming interface lies, however, in its independence from a protocol, which is why an internal software interface is provided in most operating systems with the purpose of attaching an additional protocol module to the socket programming interface, which facilitates the realization of the invention.

The implementation of the invention will hereinafter be explained in more detail on the basis of the operating system Windows as an example and FIG. 4.

Figure 4:
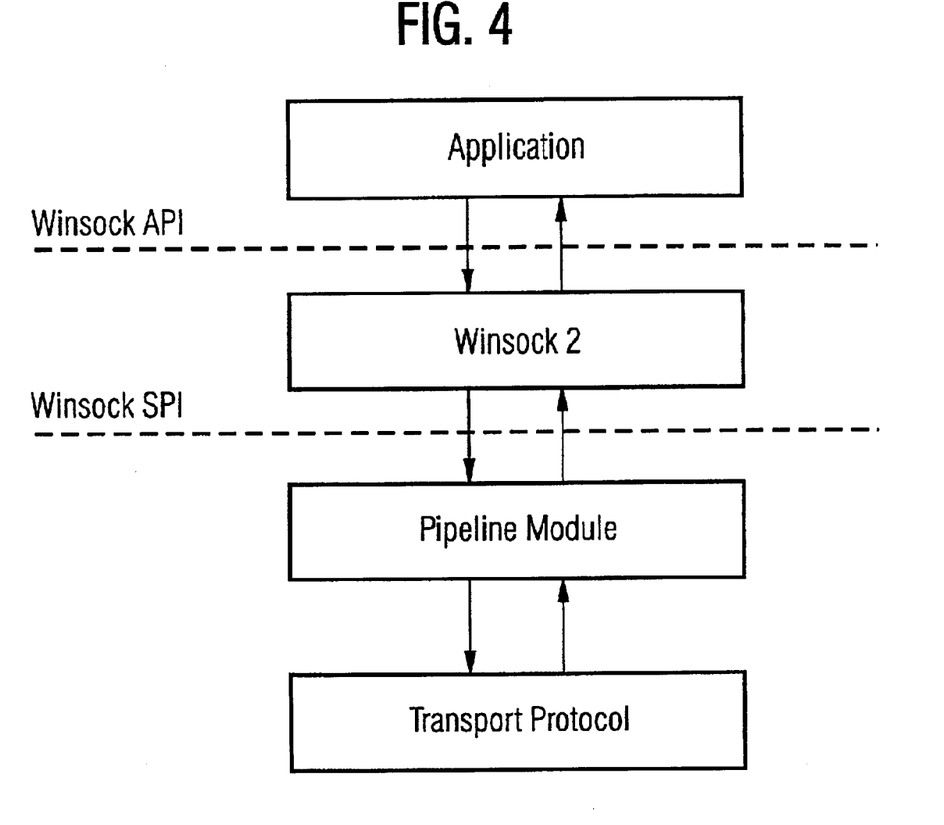
FIG. 4 shows an illustration of an example of an implementation.

FIG. 4 depicts a protocol stack comprising the involved instances. The directly adjacent instances, application, Lit Winsock2, pipeline module and transport protocol communicate with each other, which is marked by the arrows. The communication of the adjacent layers takes place by means of a defined software interface, for example, the communication between the instance application and the instance Winsock 2 takes place by means of the socket programming interface, which in the operating system Windows is called Winsock API. The software interface Winsock SPI (Service Provider Interface), which is explained in more detail in "Windows Sockets 2. Service Provider Interface", Revision 2.2.2, Microsoft, August 1997, is used for the communication between the Winsock 2 layer and the protocol implemented underneath, in this case the pipeline module.

What is claimed is:

1. Method for a fast performance of network operations via a network having high delay times by means of a module for processing a system call of an application layer and for initiating network operations of a network layer, comprising:

transmission of the system call to the module, determination of an execution mode of the system call by differentiating between a blocking and a non-blocking execution mode, and direct return of a logical value to the application layer and initiation of a network operation in the case of a non-blocking execution mode, wherein, upon the initiation of the network operation, a blocking system call is interpreted by the module as a non-blocking system call, in which an actual result of the system call executed in a partner instance is awaited, without blocking execution of the calling application.

2. Method according to claim 1, wherein the network operation is transmitted to a partner instance communicating with a unit initiating the network operation.

3. Method according to claim 2, wherein the network operation received in the partner instance is converted into an operation, which is performed, and wherein a result of the operation is returned to the unit that initiated the network operation.

4. Method according to claim 3, wherein a processing of the received result of an operation is realized in the module.

5. Method according to claim 3, wherein the received results indicate a non-blocking state and have a logical value, or are a result of a blocking system call interpreted by the module as a non-blocking system call and executed in the partner instance.

6. Method according to claim 3, wherein the received results with a non-blocking execution mode are buffered.

7. Method according to claim 1, wherein the logical values either have a logical positive or a logical negative propositional value.

8. Method according claim 7 wherein the logical negative results are reported to the application with the execution of the following system call in the form of a logical negative return value.

9. Method according to claim 3, wherein, with a non-blocking system call, in the case of non-pending negative results of previous calls a logical positive value is returned to the application.

10. Method according to claim 1, wherein the last system call of a connection is set into a blocking state in order to guarantee a return report of the results of the previously performed operations.

11. Method according to claim 1, wherein blocking system calls are realized by waiting for the result of the system call executed in the partner instance.

12. Method according to claim 1, wherein the system calls are socket system calls.

13. Method according to claim 12, wherein the socket system calls form a programming interface for an operating system.

14. Method according to claim 1, wherein the module is a pipeline module.

* * * * *

UNITED STATES PATENT AND TRADEMARK OFFICE
CERTIFICATE OF CORRECTION

PATENT NO. : 6,820,269 B2  Page 1 of 1
APPLICATION NO. : 09/730873
DATED : November 16, 2004
INVENTOR(S) : Baucke et al.

It is certified that error appears in the above-identified patent and that said Letters Patent is hereby corrected as shown below:

In Column 2, Line 61, after "to" delete "tri".

In Column 3, Line 24, after "receiver," delete "go".

In Column 5, Line 12, after "in view of" delete "the error message is the error message is as early as to effect possible." and insert -- the error message is to effect the error message as early as possible. --, therefor.

In Column 5, Line 15, after "previous" delete "of".

In Column 5, Line 51, after "said" delete "Up".

In Column 7, Line 18, after "results of the" delete "if".

In Column 8, Line 19, delete "id" before "(Round Trip Time)".

In Column 8, Line 20, after "following" delete "is".

In Column 9, Line 20, after "application," delete "Lit".

Signed and Sealed this

Fifteenth Day of April, 2008

JON W. DUDAS
*Director of the United States Patent and Trademark Office*